Nov. 16, 1954 W. HORN 2,694,340
INTERFERENCE MICROSCOPE
Filed Feb. 2, 1951 3 Sheets-Sheet 1
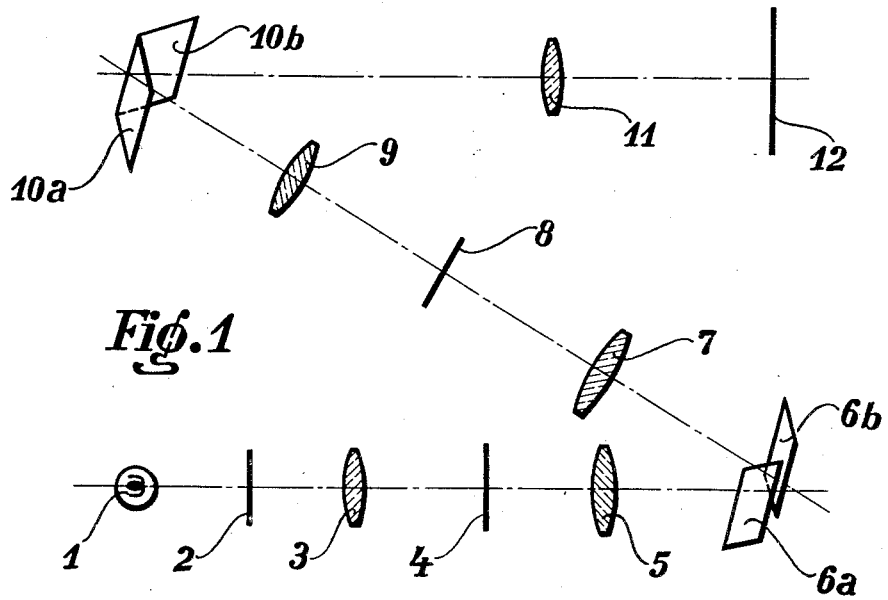
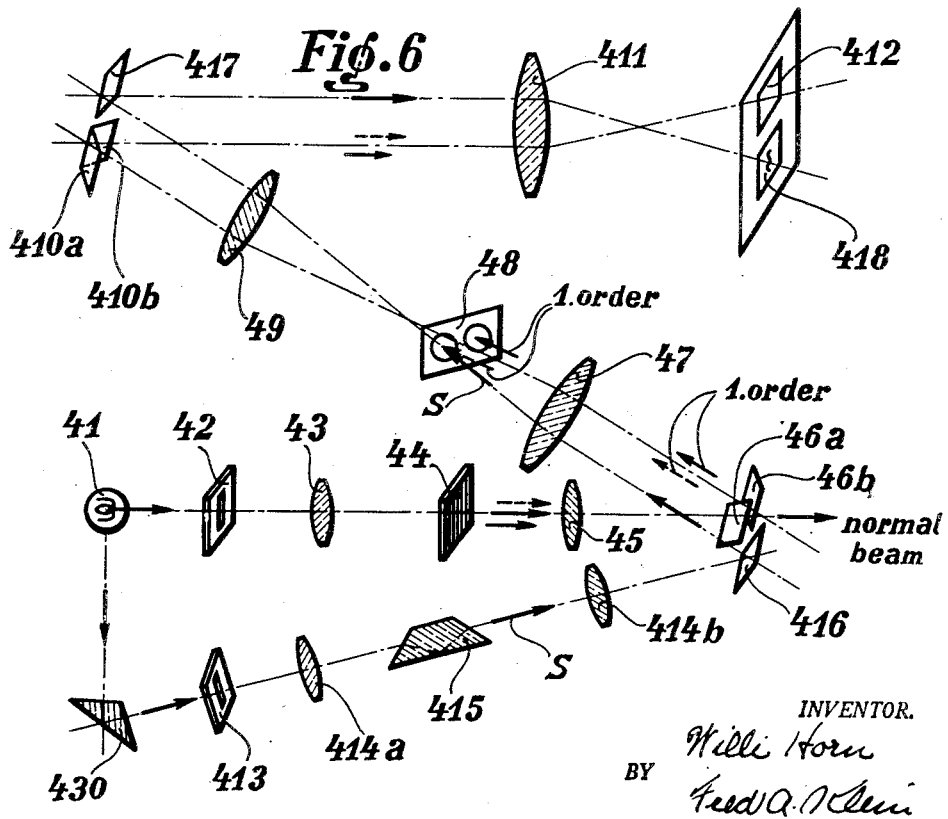
INVENTOR.
Willi Horn
BY Fred A. O'Klein
attorney

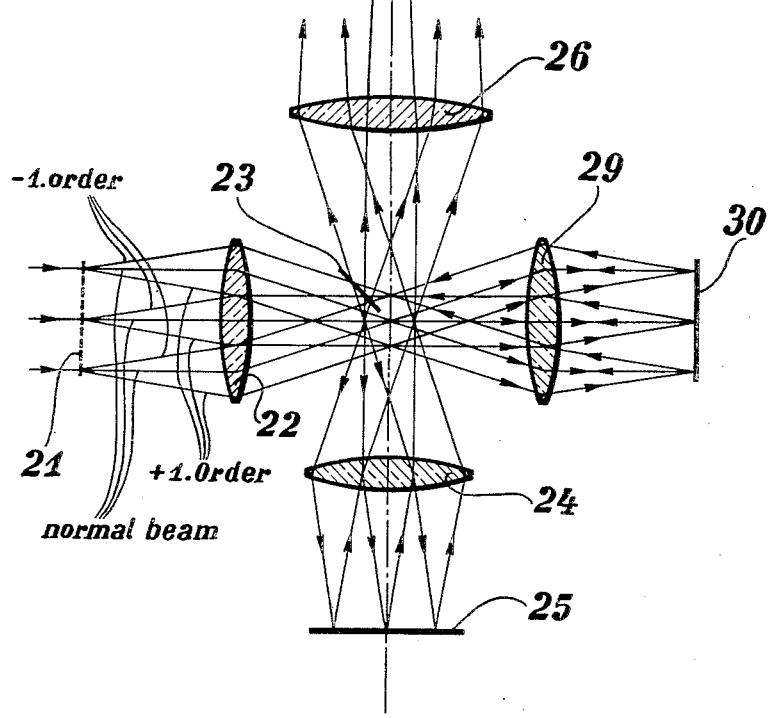

Nov. 16, 1954     W. HORN     2,694,340
INTERFERENCE MICROSCOPE
Filed Feb. 2, 1951     3 Sheets-Sheet 3
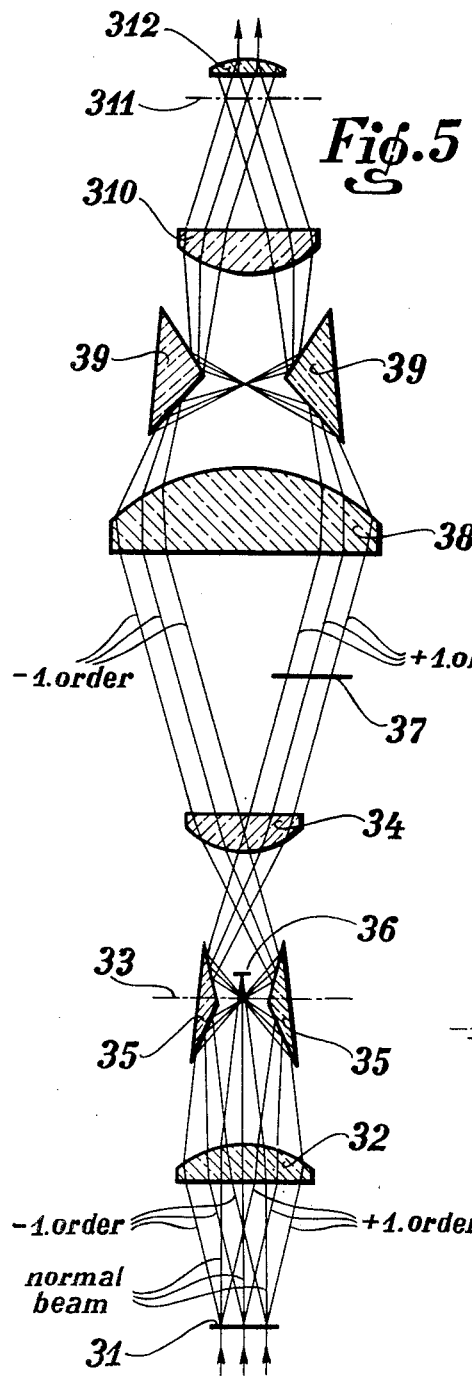
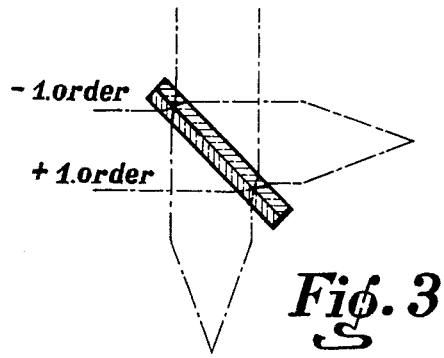
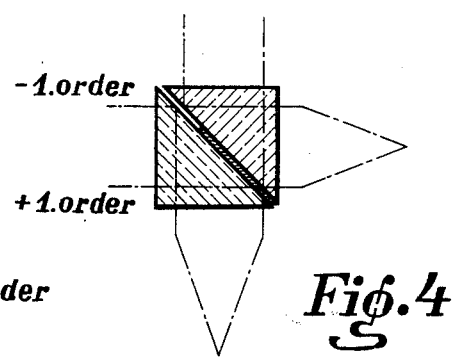
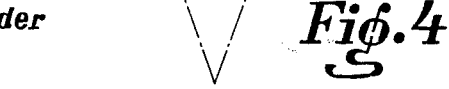
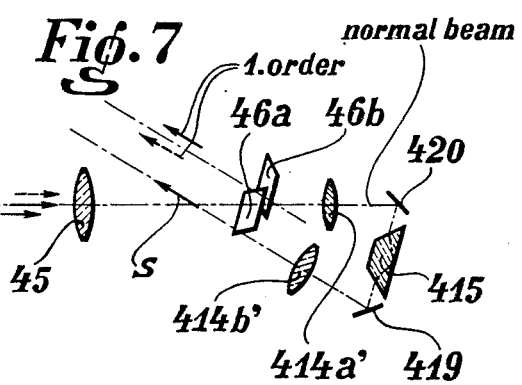

United States Patent Office 2,694,340
Patented Nov. 16, 1954

2,694,340

INTERFERENCE MICROSCOPE

Willi Horn, Gossersdorf/Konzell, Germany, assignor to Ernst Leitz, G. m. b. H., Wetzlar, Germany, a corporation of Germany Application February 2, 1951, Serial No. 208,991

Claims priority, application Germany May 8, 1950

4 Claims. (Cl. 88—39)

The present invention relates to interferometers, and more particularly to interferometers comprising a diffraction grating and used in connection with microscopes and the striae method of observation.

Interferometers are based on the principle of the interference of light. In such devices, a beam of light is divided into two coherent paths and the two light paths are brought into interference. The object is placed into one of the beam paths so that the difference in the two optical paths becomes visible in the interference pattern and can be used for observational and measuring purposes.

In previously known interferometers, the light beam was divided by plane-parallel plates and the size of the field of view was dependent on the size of the plates which cannot be made interference-accurate beyond certain limits (see W. Kinder, Theorie des Mach-Zehnder Interferometers, Optik I, 1946, pp. 413–448, particularly p. 424). I have already proposed to overcome this disadvantage and obtain fields of view of larger dimensions by using a diffraction grating for dividing the light beam instead of the plane-parallel plates of the prior art. This is based on the principle, known per se, that colorless, achromatic interference bands may be produced by using as secondary light sources grating spectra of different orders and bringing the coherent light beams into interference. Achromatic bands per se are described, for instance, in König, Geometrische Optik, Handbuch der Physik, II, p. 380, and Gehrke, Handbuch der phys. Optik I, pp. 469–470.

Microscopes in combination with conventional interferometers, such as a Michelson interferometer, are known. In such an apparatus, a monochromatic light source must be used since all bands, except the center band, would otherwise have colored rims.

If achromatic interference bands are employed, a white light source may be used. Such a device has the added advantage of facilitating the examination of the optical characteristics of an extended object in a large field of view since the two coherent light beams may be easily separated behind the diffraction grating so that a large object may be placed in the path of only one of said beams. The object is inserted in a plane which is conjugate to the plane of the grating.

It is an object of the present invention to provide improvements in interference microscopy.

It is a more specific object of this invention to provide microscopes having incident or transmitted illumination with a secondary light source of grating spectra to produce achromatic interference bands.

It is a further object of the invention to provide an interferometer with grating spectra in combination with an apparatus for carrying out the striae method of observation.

The objects and advantages of the present invention are accomplished by using a grating spectrum as secondary light source of an optical instrument of observation, separating two coherent light beams emanating from the grating, placing an object in the path of one of said beams in a plane conjugate to the plane of the grating, and bringing the two coherent light beams into interference in the plane of image.

The construction of the compound optical devices according to the invention is exceedingly simple.

In one embodiment of the invention, the beam of one grating spectrum, for instance the spectrum of the −1 order, is deflected through one part of the objective of a microscope by a mirror which is inclined 45° in respect to the direction of incidence, and is directed toward a reflecting surface. This surface is either formed by the object, if it is opaque, or, if a transparent thin body is to be examined, by an appropriate surface arranged behind the transparent object. After the reflection from this surface, this spectrum beam is directed through another part of the objective into the image plane. The second spectrum, for instance the spectrum of the +1 order, passes straight through one part of a second objective, is reflected through another part of the second objective by a mirror arranged behind the objective, is directed to the reverse side of the above-described mirror being inclined at 45°, and thence into the plane of the eye-piece where it is brought into interference with the first spectrum.

The optical paths in the glass may be equalized by making the above-described inclined mirror of two plates which are made reflective only in the place where the one spectrum beam impinges before reflection and the other after reflection. The mirrored element may also consist of two cemented prisms which are mirrored or totally reflective in the mentioned place of their hypothenuses.

In accordance with a second embodiment of this invention, in a microscope having transmitted illumination, the light beams of the grating spectra, i. e. of the two spectra of first order, are spatial separated by mirrors, and the object is placed in one of the beams in that plane which is conjugate to the grating, and both beams are reunited in the image plane whereby achromatic interference bands are produced in that plane. The special mirror arrangements whereby the beams cross each other once between the mirrors are herebelow described in more detail and are also part of the invention.

In still another embodiment of this invention, interferometer observation is combined with the known striae method whereby the interpretation of interference patterns is facilitated. Since interference patterns consist of a plurality of interference bands which are curved in accordance with the characteristics of the examined object, it is often difficult to interpret such patterns, particularly if the objects change quickly. For instance, the observation of gas streams in a wind tunnel by means of an interferometer has not given completely satisfactory results. In such instances, it has been found desirable to combine the observation by means of an interferometer with the striae method. A combination of these two observational methods is difficult, however, if use is made of a Michelson or Mach-Zehnder interferometer because the adjustment of these instruments is very sensitive in respect to disturbances.

Interferometers with achromatic interference bands make the combination with the striae method possible because such interferometers contain in both light beams the same optical image forming system and are, therefore, insensitive in respect to disturbances.

In accordance with this latter embodiment of the invention, an interferometer having secondary light sources formed by grating spectra is combined with a beam path which enables observation by means of the striae method simultaneously with interference observation of the same object locus and at the same instant. More particularly, the light beam emanating from a second illuminated slit is directed through the object locus which is in the path of one of the coherent light beams of the interferometer, and hence to a striae diaphragm. This produces an interference as well as a striae pattern. The image forming optical systems in the part of the beam path which produces the interference are also used for the beam path of the striae producing apparatus whereby the above-mentioned sensitivity against disturbances is eliminated. In one of the modifications of this latter apparatus, the normal beam of the grating spectrum is used to produce the striae pattern.

The various objects, features and advantages of the invention will become more apparent in connection with the following detailed description of some preferred embodiments thereof, taken in conjunction with the accompanying drawing, wherein Fig. 1 shows an interferometer with grating spectra for producing achromatic interference bands;

Fig. 2 illustrates a microscope having top-light illumination and incorporating an interferometer;

Fig. 3 and Fig. 4 show details of Fig. 2;

Fig. 5 illustrates a microscope having transmitted illumination and incorporating an interferometer;

Fig. 6 illustrates an interferometer combined with the striae method; and

Fig. 7 shows a detail of Fig. 6.

Referring now to Fig. 1, there is shown a light source 1 illuminating slit 2 which stands in the focal point of lens 3. Diffraction grating 4 is placed between lens 3 and lens 5, the latter lens projecting each of the diffraction images near each of the two plane mirrors 6a and 6b which are disposed at an angle in respect to each other. The line of intersection of the two mirror planes is somewhat inclined in respect to the optical axis. Mirrors 6a and 6b are spaced apart so that the normal beam may be eliminated from the optical system through the opening therebetween. The beams of higher than first order are absorbed by dark areas while the beams of first order are divergently reflected so that two separate beams travel side by side. Object plane 8 is made conjugate to the plane of grating 4 by means of lens 7. Therefore, there are produced in plane 8 two separate image fields into one of which the object is placed. Both beam paths are brought together into interference in plane 12 by means of lens 9, mirror 10a, 10b, which is also inclined in respect to the optical axis, and lens 11. The interference pattern appears in plane 12 and can, if desired, be viewed through the eyepiece of a microscope or be reproduced on a photographic plate placed in said plane. Mirrors may be used instead of lenses throughout the system.

Figs. 2, 3 and 4 illustrate a microscope having incident illumination combined with an interferometer, according to one embodiment of the invention. As shown in Fig. 2, the beams of the −1 order emanating from grating 21 are made convergent by lens 22, are reflected by mirror 23 and pass through one part of objective 24. After reflection by object 25, this spectrum beam passes through another part of the objective, thence through lens 26 and image plane 27 to eyepiece 28. The other bundle (+1 order) leaves lens 22 and by-passes mirror 23, passes through one part of objective 29 and is reflected by mirror 30 through another part of objective 29 to the reverse side of mirror 23, and thence to lens 26, image plane 27 and eyepiece 28, where it produces an interference pattern with the first bundle.

The normal beam by-passes mirror 23 and is reflected into itself by mirror 30.

Fig. 3 shows one means of equalizing the optical paths in the glass of the light beams of −1 and +1 order. The mirror consists of two identical plane-parallel plates which are cemented together and have a reflecting surface only where the bundle of −1 order impinge.

Fig. 4 illustrates another embodiment of paths-equalizing means. In this embodiment, two prisms are cemented together in such manner that the reflection is effected by mirror or by total reflection.

Fig. 5 shows a microscope having transmitted light illumination combined with an interferometer, in accordance with another embodiment of the invention. Parallel light beams impinge upon diffraction grating 31, only the normal beam and the beams of the first order being shown for purposes of a simplified and clarified illustration. Lens 32 projects the grating spectra upon plane 33. Mirror arrangement 35 is placed between lens 32 and condensor 34, said mirrors being adapted to increase the inclination of the two bundles of the first order in respect to each other. The normal beam is screened off by diaphragm 36. As shown, the bundles of the first order are completely and widely separated after they leave condensor 34. In the plane which is made conjugate to the diffraction grating by means of the condensor, there is placed, in the path of one of the bundles, the object 37. Objective 38, another mirror arrangement 39 and lens 310 produce in image plane 311 the image of the object to be viewed by eyepiece 312. The image of the diffraction grating is also formed in plane 311. Achromatic interference bands appear also in this plane which change with the phase delay produced by the object placed into one beam path.

Mirror arrangements 35 and 39 each consist of two angle mirrors whose edges are so arranged opposite each other that the light bundles cross once therebetween. This arrangement imparts to the light beams the desired change of direction.

Figs. 6 and 7 illustrate the combination of an interferometer with an apparatus for carrying out the striae method according to another embodiment of the present invention. Fig. 6 shows an arrangement with two slits and Fig. 7 shows, in part, an arrangement for using the normal beam.

The interferometer arrangement shown in Fig. 6 is similar to the one of Fig. 1. It comprises light source 41, slit 42, lens 43, diffraction grating 44, lens 45, mirrors 46a and 46b, optical system (lens or concave mirror) 47, object plane 48, optical system 49, mirrors 410a and 410b, optical system 411 and image plane 412.

The arrows marked "1. order" indicate the optical path of the light beams which serve to produce the interference pattern. The central or normal beam leaves the system through the space between mirrors 46a and 46b, as shown.

The above-described interferometer is combined with an apparatus for carrying out the striae method in such manner that the pattern produced by interference and the patterns produced by the striae method are obtained by the same light source, i. e. a flash light, and from the same object part. The light is directed by optical system 430 through slit 413, lenses 414a and 414b, and the Dove-prism 415 placed therebetween, toward deflecting mirror 416 which is arranged either above or underneath the line of intersection of mirrors 46a, 46b and is somewhat inclined in respect to that line. Mirror 416 directs the light beam indicated with S through the optical system 47 toward that part of the object plane 48 wherethrough there also passes one of the light beams of the interferometer. Optical system 49 directs the light beam toward the diaphragm 417. The striae pattern is formed in the image plane 418 next to interference pattern 412 by means of optical system 411.

As shown in Fig. 7, it is also possible to use the normal beam for producing the striae pattern. The same reference characters in this figure indicate the same parts as in Fig. 6. As shown, there is arranged behind mirrors 46a, 46b a mirror 420 which directs the normal beam by means of mirror 419 and lenses 414a' and 414b' to lens 47 (see Fig. 6). Between mirrors 419 and 420 there is provided the Dove-prism 415'. By rotating the prisms 415 and 415', the position of the slit image can be adjusted to the characteristics of the object.

While the invention has been described with reference to some preferred embodiments, it should be clearly understood that these have been given merely for purposes of illustration and not as limitations upon the spirit and scope of the invention as defined in the appended claims.

What is claimed is:

1. An interference microscope for incident illumination comprising a first objective facing a reflecting object, a second objective facing a reference mirror, and a diffraction grating illuminated by an incident light beam and splitting said light beam into coherent light beams, a mirror inclined 45° in respect to the direction of the incident light beam and arranged in the path of and deflecting only one light beam emerging from the grating into one part of the first objective; said object being arranged in a plane conjugate by said first objective to the diffraction grating, said first objective directing the one light beam to the reflecting surface of the object whence it is reflected to another part of the first objective; a lens whereto the one light beam bypassing said inclined mirror is directed from said other part of the first objective; a second light beam emerging from said grating bypassing said inclined mirror and passing straight to one part of the second objective; reflecting reference mirror arranged behind the second objective and reflecting said second beam through another part of the second objective to the reverse side of said inclined mirror whence it is reflected to said lens; and said lens projecting the second beam in the image plane where it forms an achromatic interference fringe system with the first beam.

2. An interference microscope as defined in claim 1 wherein said mirror consists of two cemented plates which are reflective only at those areas at which the one spectrum beam impinges thereon.

3. An interference microscope as defined in claim 1, wherein said reflecting surface consists of two cemented prisms whose hypotenuses are mirrored only at those areas where the one spectrum beam impinges thereon.

4. An interference microscope as defined in claim 1 wherein said reflecting surface consists of two cemented prisms having an air space for total reflection between their hypotenuses only where the one spectrum beam impinges thereon.

UNITED STATES PATENTS

| Number | Name | Date |
| --- | --- | --- |
| 2,601,175 | Smith | June 17, 1952 |

FOREIGN PATENTS

| Number | Country | Date |
| --- | --- | --- |
| 10,200 | Great Britain | of 1911 |
| 355,911 | Great Britain | Sept. 3, 1931 |
| 639,014 | Great Britain | June 21, 1950 |
| 815,410 | Germany | Oct. 1, 1951 |